United States Patent
Tanizaki et al.

(10) Patent No.: US 8,510,038 B2
(45) Date of Patent: Aug. 13, 2013

(54) ROUTE GUIDANCE SYSTEM AND ROUTE GUIDANCE METHOD

(75) Inventors: Daisuke Tanizaki, Okazaki (JP); Kiyohide Kato, Okazaki (JP); Kenichi Murata, Nissin (JP); Kiyokazu Okada, Miyoshi (JP)

(73) Assignees: Aisin AW Co., Ltd., Anjo (JP); Toyota Jidosha Kabushiki Kaisha, Toyota (JP)

( * ) Notice: Subject to any disclaimer, the term of this patent is extended or adjusted under 35 U.S.C. 154(b) by 698 days.

(21) Appl. No.: 12/449,770

(22) PCT Filed: Apr. 22, 2008

(86) PCT No.: PCT/JP2008/058235
§ 371 (c)(1),
(2), (4) Date: Jul. 15, 2010

(87) PCT Pub. No.: WO2008/139928
PCT Pub. Date: Nov. 20, 2008

(65) Prior Publication Data
US 2010/0292922 A1 Nov. 18, 2010

(30) Foreign Application Priority Data
Apr. 27, 2007 (JP) ................................. 2007-119327

(51) Int. Cl.
*G01C 21/34* (2006.01)
(52) U.S. Cl.
USPC ........... 701/431; 340/988; 701/411; 701/446; 701/533
(58) Field of Classification Search
USPC .......... 701/211, 411, 431, 446, 533; 340/988
See application file for complete search history.

(56) References Cited

U.S. PATENT DOCUMENTS

| 6,269,403 | B1 | 7/2001 | Anders |
| 6,388,582 | B2 * | 5/2002 | Yamashita et al. ............ 340/988 |

(Continued)

FOREIGN PATENT DOCUMENTS

| JP | A-2000-251197 | 9/2000 |
| JP | A 2003-329468 | 11/2003 |

(Continued)

OTHER PUBLICATIONS

Japanese Patent Office, Notification of Reason(s) for Refusal mailed Sep. 14, 2010 in Japanese Patent Application No. 2007-119327 w/Partial English-language Translation.

*Primary Examiner* — Thomas Black
*Assistant Examiner* — Wae Louie
(74) *Attorney, Agent, or Firm* — Oliff & Berridge, PLC

(57) ABSTRACT

A route guidance system includes: a current position detecting unit; a display condition determination processing unit that determines, for each of pieces of lane data that correspond to a lane list display section set in a forward direction of a vehicle position, whether a display condition for creating a lane list is satisfied, based on the pieces of lane data; a display setting processing unit that sets a piece of the lane data that satisfies the display condition as a display target; and a list display processing unit that displays the lane list based on the piece of the lane data that has been set as the display target. Thus, the piece of the lane data that satisfies the display condition is set as the display target, and the lane list is displayed based on the piece of the lane data that has been set as the display target. Consequently, the size of the lane list can be prevented from becoming too large.

5 Claims, 9 Drawing Sheets

(56) References Cited

U.S. PATENT DOCUMENTS

| | | | |
|---|---|---|---|
| 6,700,505 B2* | 3/2004 | Yamashita et al. | 340/988 |
| 7,127,350 B2 | 10/2006 | Oikubo | |
| 2001/0013837 A1* | 8/2001 | Yamashita et al. | 340/988 |
| 2001/0027377 A1 | 10/2001 | Shimabara | |
| 2002/0053984 A1* | 5/2002 | Yamashita et al. | 340/988 |
| 2003/0074131 A1 | 4/2003 | Barkowski et al. | |
| 2005/0149262 A1 | 7/2005 | Oikubo | |
| 2007/0016367 A1 | 1/2007 | Sakashita et al. | |
| 2007/0109111 A1* | 5/2007 | Breed et al. | 340/435 |
| 2007/0124069 A1* | 5/2007 | Nakayama et al. | 701/210 |
| 2007/0124072 A1* | 5/2007 | Nakayama et al. | 701/211 |
| 2008/0150786 A1* | 6/2008 | Breed | 342/53 |
| 2008/0161987 A1* | 7/2008 | Breed | 701/27 |
| 2010/0292922 A1* | 11/2010 | Tanizaki et al. | 701/211 |

FOREIGN PATENT DOCUMENTS

| | | |
|---|---|---|
| JP | A-2004-125512 | 4/2004 |
| JP | A 2004-239740 | 8/2004 |
| JP | A 2004-340825 | 12/2004 |

\* cited by examiner

ROUTE GUIDANCE SYSTEM AND ROUTE GUIDANCE METHOD

TECHNICAL FIELD

The present invention relates to a route guidance system and a route guidance method.

BACKGROUND ART

In a known navigation apparatus, when a driver inputs a destination and sets search conditions, a route search process is performed based on the set search conditions, and a route from a starting point indicated by the position of a host vehicle (hereinafter, the "vehicle position") to the destination is searched based on map data. The route found in the search (hereinafter, the "searched route") is displayed on a map screen provided on a displaying unit, together with the vehicle position, and guidance along the searched route (hereinafter "route guidance") is provided. As a result, the driver is able to drive the vehicle along the searched route that is displayed.

When the vehicle passes through any of the intersections on the searched route, and in the case where any of the roads on the searched route has a plurality of lanes, a lane list that serves as a lane guidance diagram is displayed on a predetermined screen provided on the displaying unit (see, for example, Japanese Patent Application Publication No. JP-A-2003-329468).

In this case, a section within a predetermined distance in the forward direction of the vehicle position is set as a lane list display section. A lane list is generated for each of the intersections that are within the lane list display section and have a traffic light. For each of the intersections that are positioned between the vehicle position and a guidance intersection, the lane list shows the lanes in each of the roads that have access to the intersection (hereinafter, the "access roads"). For this purpose, the information of the lanes is recorded into a data recording unit as lane data.

DISCLOSURE OF THE INVENTION

However, in the known navigation apparatus described above, the lane data is generated based on features provided on the road, such as boundary lines like road boundary lines that are drawn with solid lines in order to indicate the boundaries of roads and dividing lines for dividing each road into lanes (i.e., vehicular lane boundary lines), as well as traffic separation marks each of which indicates, by using an arrow, the traveling direction permitted for the vehicles in the corresponding lane. For example, in the case where the level of precision in a matching process that is performed to identify the vehicle position is set to be high, it becomes necessary to set the level of precision of feature data to be high. In that case, a piece of lane data is generated for each of the different types of boundary lines and the like, in other words, for each of the different line types.

If a lane list is created so that a lane for each of the pieces of lane data can be identified, the number of lane groups will be large. As a result, the size of the lane list will be too large and exceed the maximum drawing area of the displaying unit.

FIG. 2 is a drawing for explaining the roads for which a lane list is to be displayed according to the related art. FIG. 3 is a drawing that shows lane data according to the related art. FIG. 4 is a drawing that shows a lane list according to the related art.

In FIG. 2, the reference character "pr" denotes the vehicle position; the reference character "ri" (where i=1 or 2) denotes a road; the reference character "cr1" denotes an intersection at which two or more predetermined roads intersect one another; and the reference character "km" (where m=1 to 3) denotes a lane. In particular, the lane k3 is an additional lane that is additionally provided immediately before the intersection cr1. The reference character "e1" denotes a road boundary line that serves as a first boundary line and is drawn with a solid line on the left-side edge of the road r1; the reference character "e2" denotes another road boundary line that serves as a second boundary line and is drawn with a solid line on the right-side edge of the road r1; and the reference character "sj" (where j=1 or 2) denotes a dividing line that divides the road r1 into the lanes km. The dividing line s1 is made up of a plurality of portions "sa" to "sd" that are drawn with mutually different types of lines. The reference character "pm" (where m=1 to 3) denotes a traffic separation mark that indicates, by using an arrow, the traveling direction permitted for the vehicles in the corresponding lane km.

In the direction along the road r1, for example, in the case where the type of line used in the road boundary lines e1, e2 or the dividing line sj changes, or where one or more traffic separation marks pm are displayed, or where the number of lanes km increases or decreases, or where a lane km is displaced, pieces of lane data are generated so as to be mutually different in correspondence with the part before the location point and the part after the location point. For example, in FIG. 3, the type of line changes at each of the location points f1, f2, and f3. Also, at the location point f4, a lane km is additionally provided, and the traffic separation marks pm are displayed. Thus, lane data d1, lane data d2, lane data d3, and lane data d4 are generated in order to respectively define the types of lines in the sections such as the section up to the location point f1, the section from the location point f1 to the location point f2, the section from the location point f2 to the location point f3, and the section from the location point f3 to the location point f4. In addition, lane data d5 indicating that a lane km is additionally provided in the section from the location point f4 to the intersection cr1 is generated. Also, lane data d6 indicating that the traffic separation marks p1 to p3 are respectively displayed in the lanes k1 to k3 immediately before the intersection cr1 is generated. The notation "ADD RIGHT 2" in the lane data d5 denotes that, in the section from the location point f3 to the location point f4, an additional lane is provided next to the lane k2 so as to provide two lanes, namely, the lanes k2 and k3.

Accordingly, when a lane list Ls1 as shown in FIG. 4 is generated according to the pieces of lane data d1 to d6, lane groups m1 to m4 are formed so that one lane group is arranged in each line, in correspondence with the pieces of lane data d1 to d4, respectively. In addition, a lane group m5 is formed so as to be arranged in one line, in correspondence with the pieces of lane data d5 and d6. As a result, the lane list Ls1 is generated so as to include the lane groups m1 to m5 that are arranged in five lines in total. Thus, the size of the lane list Ls1 is too large and exceeds the maximum drawing area of the displaying unit. As additional information, as for the lane k3 within the lane group m5 shown in the lane list Ls1, the base portion eg1 on the lane group m4 side is drawn at an angle in order to indicate that the lane k3 is an additional lane.

It is an object of the present invention to provide a route guidance system and a route guidance method with which it is possible to solve the problems in the navigation apparatus of the related art and to prevent the size of the lane list from becoming too large.

In order to achieve the above-described object, the present invention provides a route guidance system that includes: a current position detecting unit that detects a current position of a vehicle as a vehicle position; a display condition determination processing unit that determines, for each of pieces of lane data that correspond to a lane list display section set in a forward direction of the vehicle position, whether a display condition under which a lane list is to be created is satisfied, based on the pieces of lane data; a display setting processing unit that sets a piece of the lane data that satisfies the display condition as a display target; and a list display processing unit that displays the lane list based on the piece of the lane data that has been set as the display target.

According to the present invention, it is determined whether or not the display condition under which the lane list is to be generated is satisfied, based on the pieces of lane data. The piece of the lane data that satisfies the display condition is set as the display target, whereas the piece of the lane data that does not satisfy the display condition is not set as the display target. As a result, the lane list is displayed based on the piece of the lane data that has been set as the display target. Consequently the size of the lane list can be prevented from becoming too large.

BEST MODES FOR CARRYING OUT THE INVENTION

Exemplary embodiments of the present invention will be explained in detail, with reference to the drawings. In the sections below, a navigation system that serves as a route guidance system will be explained.

Figure 1:
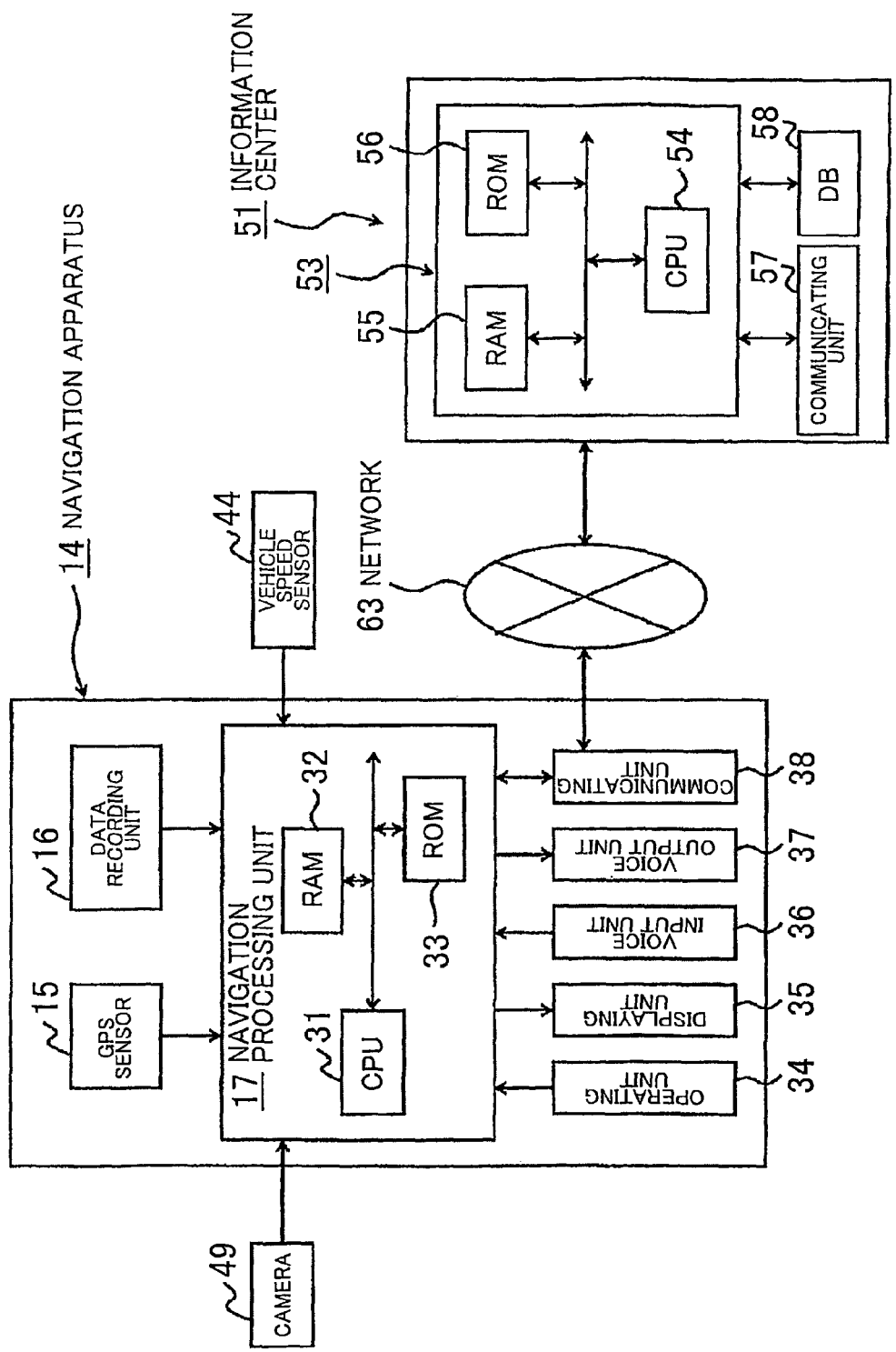
FIG. 1 is a drawing that shows a navigation system according to a first embodiment of the present invention.
Figure 2:
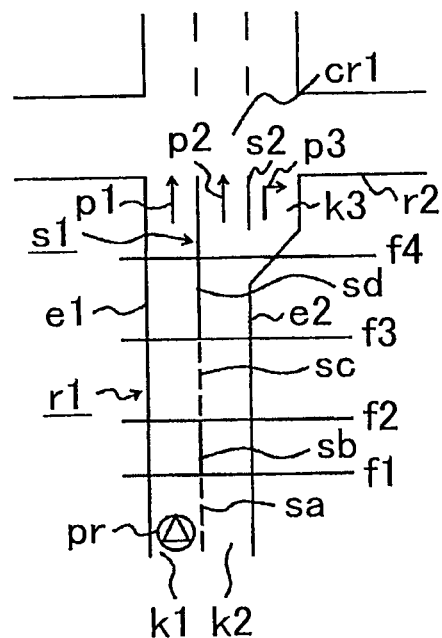
FIG. 2 is a drawing for explaining the roads for which a lane list is to be displayed according to the related art.
Figure 3:
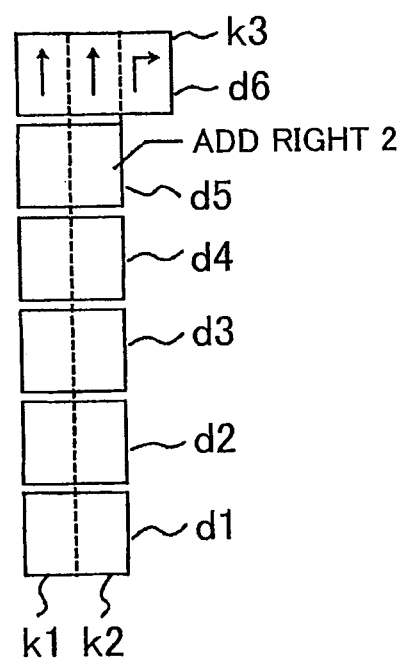
FIG. 3 is a drawing that shows lane data according to the related art.
Figure 4:
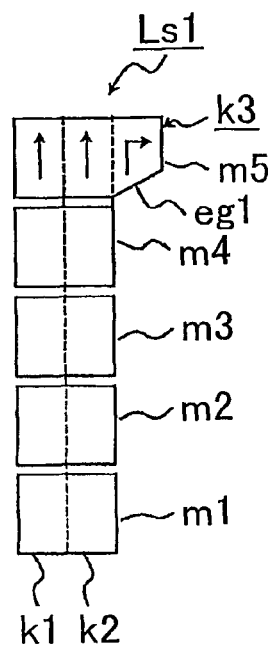
FIG. 4 is a drawing that shows a lane list according to the related art.

FIG. 1 is a drawing that shows a navigation system according to a first embodiment of the present invention.

With reference to FIG. 1, the navigation system includes a navigation apparatus 14 that serves as an information terminal, such as an on-board navigation apparatus installed in a vehicle, a network 63, and an information center 51 that serves as an information provider.

The navigation apparatus 14 includes: a GPS sensor 15 that serves as a current position detecting unit that detects the current position of the vehicle as the vehicle position and the direction of the vehicle as the vehicle direction; a data recording unit 16 that serves as an information recording unit that records therein map data as well as other various types of information; a navigation processing unit 17 that performs various types of computation processes including a navigation process; an operating unit 34 that serves as a first input unit operated by the driver of the vehicle who is the operator thereof to make predetermined inputs; a displaying unit 35 that serves as a first output unit that provides various types of displays with images displayed on a screen, which is not shown in the drawings, and notifies the driver of predetermined information; a voice input unit 36 that serves as a second input unit to which the driver can input predetermined information by voice; a voice output unit 37 that serves as a second output unit that outputs voice and notifies the driver of predetermined information; and a communicating unit 38 that serves as a transmitting and receiving unit that functions as a communication terminal. The GPS sensor 15, the data recording unit 16, the operating unit 34, the displaying unit 35, the voice input unit 36, the voice output unit 37, and the communicating unit 38 are connected to the navigation processing unit 17. In addition, a vehicle speed sensor 44 or the like that serves as a vehicle speed detecting unit that detects the speed of the vehicle is connected to the navigation processing unit 17. The GPS sensor 15 also detects the present time in addition to the vehicle position and the vehicle direction. Also, a camera 49 that serves as an image pickup device is provided at a predetermined position of the vehicle, in this embodiment of the present invention, at the rear end of the vehicle.

The data recording unit 16 records therein a map database that includes map data files. Map data is recorded in the map database. The map data includes various types of data such as intersection data related to intersections (i.e., branching points), node data related to nodes, road data related to road links; search data that has been modified for the use in searches, facility data related to facilities, and feature data related to features provided on the road. In addition, the map data also includes data used for outputting predetermined information through the voice output unit 37.

The features are displayed objects that are provided or formed on the roads in order to provide the driver with various types of information related to driving and various types of guidance related to driving. Examples of the features include marking lines, road surface markers (i.e., painted markers), pedestrian crossings, manholes, and traffic lights. Examples of the marking lines include the road boundary lines that are drawn with solid lines in order to indicate the boundaries of roads, stop lines at each of which vehicles are required to stop, dividing lines for dividing roads into lanes (i.e., vehicular lane boundary lines), and demarcation lines indicating parking spaces. Examples of the road surface markers include traffic separation marks each of which indicates, by using an arrow, the traveling direction permitted for the vehicles in the corresponding lane as well as guidance marks such as a mark "STOP" that gives an advance warning for positions at which vehicles are required to stop and a mark "Toward XX (place name)" that provides guidance related to driving directions. Further, the feature data includes position information that shows the positions of the features by using coordinates or the like and image information that shows the features by using images. Examples of the "positions at which vehicles are required to stop" include positions at which vehicles go onto a priority road from a non-priority road, railroad crossings, and intersections with flashing red lights.

The road data related to the lanes contains lane data including lane numbers that are respectively assigned to the lanes in the road and the position information of the lanes. The lane data is generated based on the features on the roads such as the boundary lines like the road boundary lines and the dividing lines as well as the traffic separation marks.

Further, the data recording unit 16 records therein a statistic database that includes statistic data files and a driving history database that includes driving history data files. As the actual record data, statistic data is recorded into the statistic data files, and driving history data is recorded into the driving history data files.

The data recording unit 16 includes a disk (not shown in the drawings) such as a hard disk, a CD, a DVD, or an optical disk that is used for recording therein various types of data. The data recording unit 16 also includes a head (not shown in the drawings) such as a reading/writing head that is used for reading and/or writing various types of data. Also, the data recording unit 16 may be configured with a memory card or the like. An external storage device is configured by the disk, the memory card, or the like.

According to the present embodiment, the data recording unit 16 is configured to include the map database, the statistic database, the driving history database, and the like. However, it is also acceptable that the information center 51 includes the map database, the statistic database, the driving history database, and the like.

The navigation processing unit 17 includes: a CPU 31 that serves as a controlling device that performs overall control over the navigation apparatus 14 and also serves as a computation device; a RAM 32 that is used as a working memory while the CPU 31 performs various types of computation processes; a ROM 33 that has recorded thereon a program used for performing control as well as other various types of programs used for searching routes to a destination and providing route guidance; and a flash memory (not shown in the drawing) that is used for recording therein various types of data and programs. An internal storage device is configured by the RAM 32, the ROM 33, the flash memory, and the like.

It is acceptable that a keyboard and/or a mouse that are provided independently of the displaying unit 35 are used as the operating unit 34. It is also acceptable that a touch panel is used as the operating unit 34. For example, in the touch panel, it is possible to perform predetermined input operations by touching or clicking on the image operating units like various types of keys, switches, and buttons that are displayed as images on a screen provided on the displaying unit 35.

A display device is used as the displaying unit 35. On various types of screens provided on the displaying unit 35, it is possible to display the vehicle position, the vehicle direction, maps, searched routes, guidance information along the searched routes, traffic information, the distance to the next intersection on a searched route, the traveling direction at the next intersection, and the like.

The voice input unit 36 may be configured by, for example, a microphone (not shown in the drawing). It is possible to input necessary information to the voice input unit 36 by using voice. The voice output unit 37 includes a voice synthesizing device and a speaker (not shown in the drawing). The voice output unit 37 outputs voice for providing route guidance based on the searched routes.

The communicating unit 38 includes a beacon receiver used for receiving various types of information such as traffic information and general information that are transmitted from a road traffic information center (not shown in the drawings) like, for example, a VICS (Vehicle Information and Communication System: a registered trademark) center that serves as an information provider. The communicating unit 38 also includes an FM receiver used for receiving information as FM multiplex broadcasting via an FM broadcast station. Further, the communicating unit 38 is configured to be able to receive the various types of data such as the map data, the statistic data, and the driving history data from the information center 51 via the network 63, in addition to the various types of information such as the traffic information and the general information.

In order to realize the function described above, the information center 51 includes a server 53, a communicating unit 57 that is connected to the server 53, and a database (DB) 58 that serves as an information recording unit. The server 53 includes a CPU 54 that serves as a controlling device as well as a computation device, a RAM 55, and a ROM 56. The database 58 records therein various types of data that is the same as or similar to the various types of data recorded in the data recording unit 16.

The navigation system, the navigation processing unit 17, the CPU 31, the CPU 54, the server 53, and the like function as a computer alone or in combination of two or more of them, so as to perform computation processes based on various types of programs and data. A recording medium is configured by the data recording unit 16, the RAM 32, the RAM 55, the ROM 33, the ROM 56, the database 58, the flash memory, and the like. An MPU or the like may be used as the computation device, instead of the CPU 31 and/or the CPU 54.

Next, basic operations performed by the navigation system configured as described above will be explained.

First, when the driver operates the operating unit 34 so that the navigation apparatus 14 is activated, a current position reading processing unit (not shown in the drawings) that is included in the CPU 31 performs a current position reading process so as to read the vehicle position and the vehicle direction that have been detected by the GPS sensor 15. Next, a matching processing unit (not shown in the drawings) that is included in the CPU 31 performs a matching process so as to identify the vehicle position by determining which one of the road links the vehicle position is located on, based on a locus of the vehicle position that has been read and the shapes and the positional arrangements of the road links that are included in the roads in the surroundings of the vehicle position.

Further, according to the present embodiment, the matching processing unit also identifies the vehicle position based on the positions of the features that are photographed objects photographed by the camera 49.

In order to realize the function described above, an image recognition processing unit (not shown in the drawing) that is included in the CPU 31 performs an image recognition process so as to read image data from the camera 49 and recognize the features in the images that are represented by the image data. Also, a distance calculation processing unit (not shown in the drawing) that is included in the CPU 31 performs a distance calculation process so as to calculate a distance from the camera 49 to each of the actual features, based on the positions of the features in the images. Further, a vehicle position identifying processing unit that is included in the matching processing unit performs a vehicle position identifying process so as to read the distance, obtain the coordinates of the features by reading the corresponding pieces of feature data from the data recording unit 16, and identify the vehicle position based on the coordinates and the distance.

Further, a traveling lane identification processing unit (not shown in the drawing) that is included in the CPU 31 performs a traveling lane identification process so as to, identify the vehicle position by comparing the features that have been recognized based on the image data with the corresponding pieces of feature data and lane data that have been read from the data recording unit 16, and identify the traveling lane in which the vehicle is traveling based on the identified vehicle position.

It is acceptable that the traveling lane identification processing unit reads a sensor output from a geomagnetic sensor (not shown in the drawing) so as to determine whether or not a detectable object that is made of a ferromagnetic material (e.g., a manhole) is positioned in a predetermined lane of the road based on the sensor output, and identify the traveling lane based on the result of the judgment. Further, it is acceptable that a GPS sensor having a high level of precision is used so as to detect the vehicle position with a high level of precision and detect the traveling lane based on the result of the detection. Further, it is also acceptable that, if necessary, the traveling lane is identified by combining a sensor output from a geomagnetic sensor, the vehicle position etc., at the same time as an image processing is performed on the image data of marking lines.

Subsequently, a basic information obtaining processing unit (not shown in the drawing) that is included in the CPU 31 performs a basic information obtaining process so as to obtain the map data by reading it from the data recording unit 16 or by receiving it from the information center 51 or the like via the communicating unit 38. In the case where the basic information obtaining processing unit obtains the map data by receiving it from the information center 51 or the like, the basic information obtaining processing unit downloads the received map data into the flash memory.

Further, a display processing unit (not shown in the drawing) that is included in the CPU 31 performs a display process so as to form various types of screens on the displaying unit 35. For example, a map display processing unit included in the display processing unit performs a map display process so as to form a map screen on the displaying unit 35, to display a map of the surroundings on the map screen, and to display the vehicle position and the vehicle direction.

As a result, the driver is able to drive the vehicle according to the map, the vehicle position, and the vehicle direction.

Also, when the driver has input a destination by operating the operating unit 34, a destination setting processing unit (not shown in the drawing) that is included in the CPU 31 performs a destination setting process so as to set the destination. In addition, as necessary, the driver is able to input and set a starting point. Alternatively, the driver is also able to register a predetermined location point and set the registered location point as the destination. After that, when the driver has input a search condition by operating the operating unit 34, a search condition setting processing unit (not shown in the drawing) that is included in the CPU 31 performs a search condition setting process so as to set the search condition.

When the destination and the search condition have been set as described above, a route search processing unit (not shown in the drawing) that is included in the CPU 31 performs a route search process so as to read the vehicle position, the destination, and the search condition and also to read the search data and the like from the data recording unit 16. The route search processing unit conducts a search for a route from the starting point indicated by the vehicle position to the destination under the search condition, based on the vehicle position, the destination, and the search data, and outputs route data that indicates a searched route. In this case, a route that has the smallest sum of link costs that are respectively assigned to the road links is selected as the searched route.

In addition, it is also possible to perform the route search process at the information center 51. In that situation, the CPU 31 transmits the vehicle position, the destination, the search condition, and the like to the information center 51 via the network 63. When the information center 51 receives the vehicle position, the destination, the search condition, and the like, a route search processing unit (not shown in the drawing) that is included in the CPU 54 performs a route search process that is similar to the one performed by the CPU 31. In the route search process, the search data and the like are read from the database 58, a route from the starting point to the destination is searched under the search condition based on the vehicle position, the destination, and the search data, and route data that indicates the searched route is output. After that, a transmission processing unit (not shown in the drawing) that is included in the CPU 54 performs a transmission process so as to transmit the route data to the navigation apparatus 14 via the network 63.

Subsequently, a guidance processing unit (not shown in the drawing) that is included in the CPU 31 performs a guidance process so as to provide route guidance. In order to provide the route guidance, a route display processing unit included in the guidance processing unit performs a route display process so as to read the route data and display the searched route on the map screen according to the route data.

When the route guidance is provided, in the case where it is necessary to instruct that the vehicle should turn to the right or to the left at predetermined intersections on the searched route, the predetermined intersections are set as guidance intersections so that the route guidance is provided to instruct that the vehicle should turn to the right or to the left at each of the guidance intersections. Also, intersections at each of which a road merges with or branches off from a junction or the like in automobile-only toll roads like expressways, urban expressways, or toll roads are also set as guidance intersections. Further, when the vehicle passes predetermined facilities such as railroad crossings provided on the searched route, these railroad crossings are set as guidance facilities so that the route guidance is provided so as to instruct that the vehicle should stop at each of the guidance facilities.

In order to provide this route guidance, a guidance point setting processing unit included in the guidance processing unit performs a guidance point setting process so as to set the guidance intersections and the guidance facilities according to the route data. The guidance points are configured by the guidance intersections, the guidance facilities, and the like.

After that, a route guidance location point setting processing unit included in the guidance processing unit performs a route guidance location point setting process so as to set one or more route guidance location points (a plurality of route guidance location points, according to the present embodiment) in such locations that are respectively positioned a predetermined distance before the guidance intersections, the guidance facilities, and the like that are provided on the searched route. When the vehicle has arrived at each of the route guidance location points, a voice output processing unit included in the guidance processing unit performs a voice output process so as to output voice of a corresponding one of predetermined guidance phrases that have respectively been set for the route guidance location points in advance, with respect to the guidance intersection, the guidance facility, or the like.

For the voice output, the guidance phrases are respectively set in advance for different distances from each of the route guidance location points to each of the guidance intersections, the guidance facilities, and the like. The set guidance phrases are recorded into the data recording unit 16 as a guidance phrase map. A location point arrival determining processing unit included in the guidance processing unit performs a location point arrival determining process. In the location point arrival determining process, the positions of the guidance intersections, the guidance facilities and the like as well as the vehicle position are read, the distances from the vehicle position to the guidance intersections, the guidance facilities, and the like are calculated, and it is determined whether or not the vehicle has approached each of the guidance intersections, the guidance facilities, and the like and has arrived at each of the predetermined route guidance location points. When the vehicle has arrived at each of the predetermined route guidance location points, the voice output processing unit refers to the guidance phrase map, reads one of the guidance phrases that corresponds to the distance, and outputs voice.

Also, a guidance intersection enlarged image forming processing unit included in the guidance processing unit performs a guidance intersection enlarged image forming process so as to form, for example, before the vehicle arrives at each of the guidance intersections, an enlarged image of the guidance intersection (i.e., an intersection enlarged image that serves as a guidance point enlarged image) in a predetermined area of the map screen and to provide the route guidance by using the intersection enlarged image. For this purpose, when the vehicle has arrived at a location that is positioned a predetermined distance before (i.e., the vehicle position side) each of the guidance intersections on the searched route, the intersection enlarged image is displayed. In this case, the intersection enlarged image shows a map of the surroundings of the guidance intersection, the searched route, and the facilities that can be used as the landmarks at the guidance intersection.

In the case where the searched route contains a road that has a plurality of lanes, a lane guidance processing unit that is included in the guidance processing unit performs a lane guidance process so as to read the searched route as well as the intersection data, the lane data, the feature data, and the like and provide lane guidance based on the searched route, the intersection data, the lane data, the feature data, and the like. For this purpose, a recommended lane setting processing unit that is included in the lane guidance processing unit performs a recommended lane setting process so as to read the searched route as well as the intersection data, the lane data, and the like and to calculate and set a recommended lane in the road link, based on the "leaving direction" indicating whether the vehicle should turn to the right/left or go straight in order to leave each of the guidance intersections on the searched route, and also based on the positional arrangement of the lanes in the road on which the vehicle is positioned after leaving each of the guidance intersections.

After that, a guidance processing unit included in the lane guidance processing unit performs a guidance process so as to read the traveling lane from the traveling lane identification processing unit and the recommended lane from a recommended lane calculation processing unit, calculate the distance from the vehicle position to the guidance intersection based on the vehicle position, and read one of the guidance phrases that corresponds to the traveling lane, the recommended lane, and the distance by referring to the guidance phrase map.

Also, the guidance processing unit causes the voice synthesizing device to operate so that the guidance phrase is output by using synthesized voice from a speaker included in the voice output unit 37, and the vehicle is directed to move from the traveling lane into the recommended lane.

Further, a lane display processing unit included in the lane guidance processing unit performs a lane display process so as to form a lane display portion in a predetermined area of the screen on the displaying unit 35. According to the present embodiment, the lane display processing unit divides the screen on the displaying unit 35 into two so as to have one on the left and the other on the right so that a first guidance screen and a second guidance screen are formed. The first guidance screen is used as a map displaying portion used for displaying maps. The second guidance screen is used as the lane displaying portion used for displaying a lane list that serves as a lane guidance diagram.

As described above, the lane display processing unit is able to provide the lane display portion in the part of the map screen on the displaying unit 35 and display the lane list in the lane display portion. For this purpose, a lane list creation processing unit included in the lane guidance processing unit performs a lane list creation process so as to read the vehicle position, read the intersection data, the lane data, the feature data, and the like from the data recording unit 16, and generate the lane list.

Next, the operation performed by the lane list creation processing unit will be explained.

Figure 5:
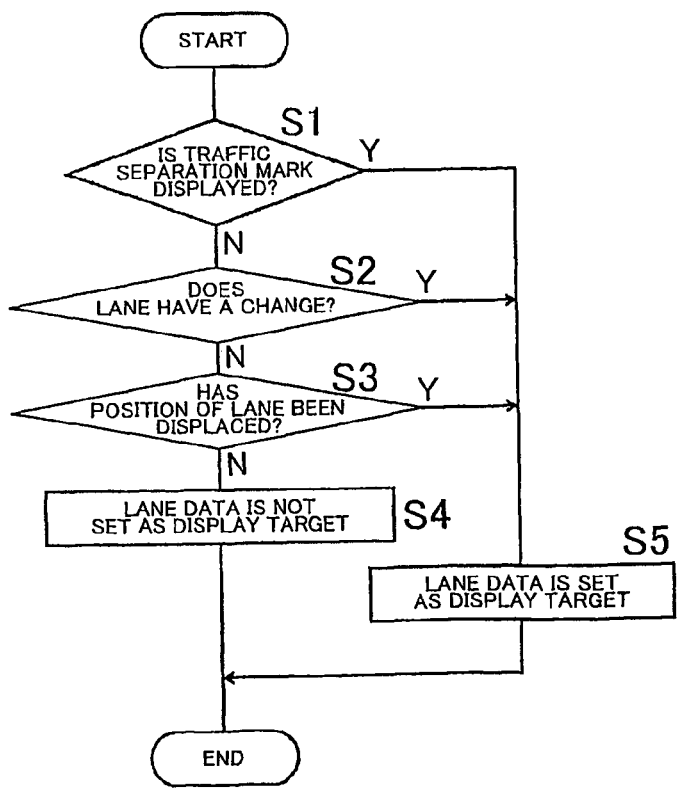
FIG. 5 is a flowchart that shows an operation performed by a lane data editing processing unit according to the first embodiment of the present invention.
Figure 6:
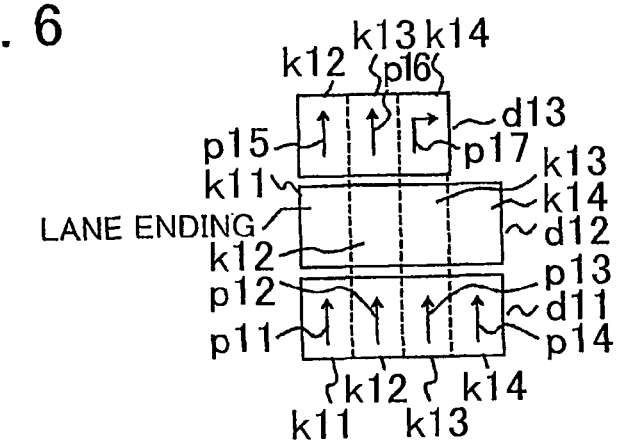
FIG. 6 is a first drawing that shows an example of edited lane data according to the first embodiment of the present invention.
Figure 7:
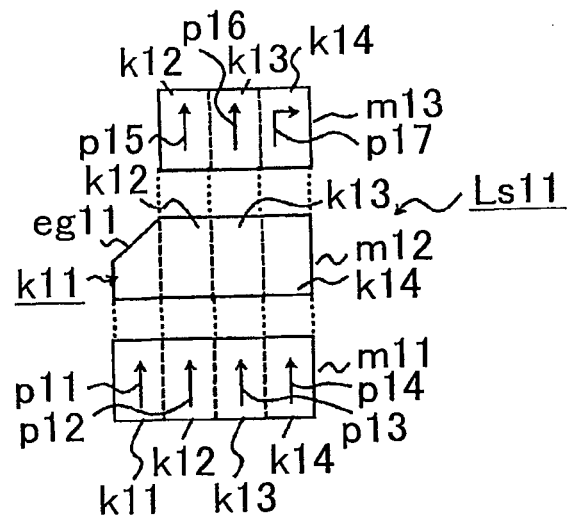
FIG. 7 is a first drawing that shows an example of a lane list according to the first embodiment of the present invention.
Figure 8:
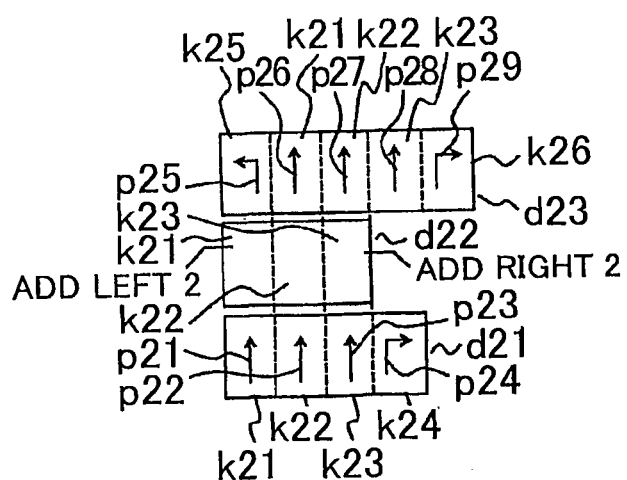
FIG. 8 is a second drawing that shows another example of edited lane data according to the first embodiment of the present invention.
Figure 9:
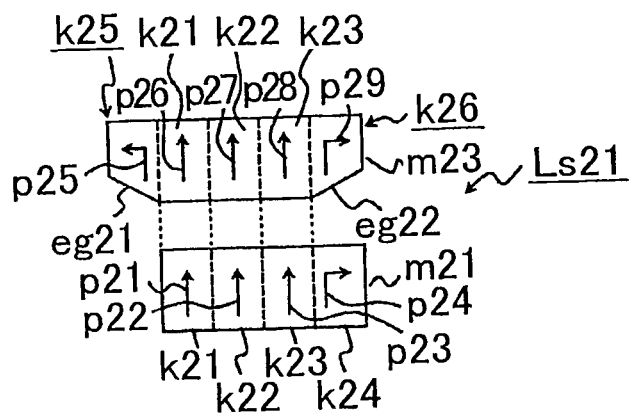
FIG. 9 is a second drawing that shows another example of a lane list according to the first embodiment of the present invention.
Figure 10:
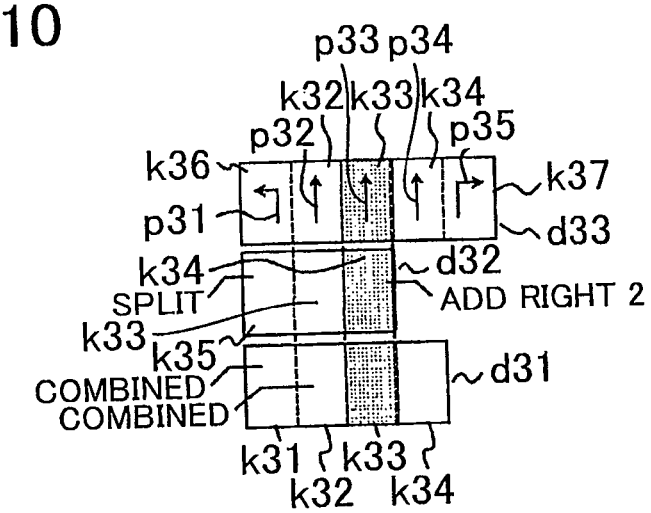
FIG. 10 is a third drawing that shows yet another example of edited lane data according to the first embodiment of the present invention.
Figure 11:
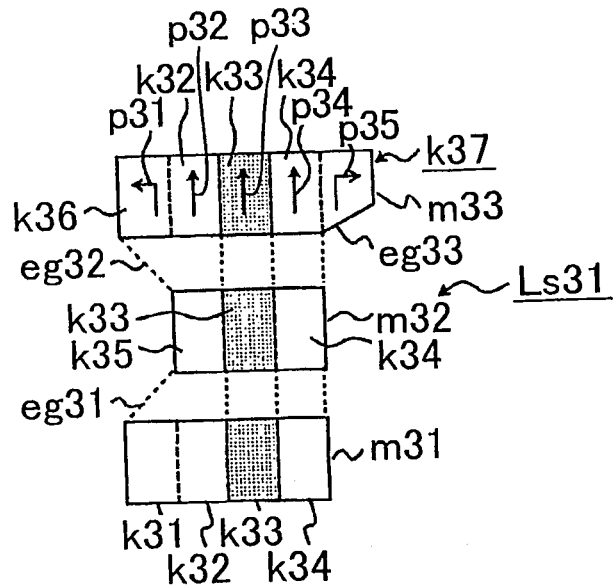
FIG. 11 is a third drawing that shows yet another example of a lane list according to the first embodiment of the present invention.

FIG. 5 is a flowchart that shows an operation performed by a lane data editing processing unit according to the first embodiment of the present invention. FIG. 6 is a first drawing that shows an example of edited lane data according to the first embodiment of the present invention. FIG. 7 is a first drawing that shows an example of a lane list according to the first embodiment of the present invention. FIG. 8 is a second drawing that shows another example of edited lane data according to the first embodiment of the present invention. FIG. 9 is a second drawing that shows another example of a lane list according to the first embodiment of the present invention. FIG. 10 is a third drawing that shows yet another example of edited lane data according to the first embodiment of the present invention. FIG. 11 is a third drawing that shows yet another example of a lane list according to the first embodiment of the present invention.

In these cases, the lane lists are created while continuity of lanes is taken into consideration so that the traveling lanes within the lane groups that are positioned adjacent to each other in a predetermined front-back direction are continued from one to another in each of the lane lists.

First, a lane list display section setting processing unit included in the lane list creation processing unit performs a lane list display section setting process so as to set, as a lane list display section, a section within a predetermined distance in the forward direction of the vehicle position. Subsequently, a lane information obtaining processing unit included in the lane list creation processing unit performs a lane information obtaining process so as to read and obtain the intersection data, the lane data, and the like.

According to the present embodiment, in the case where the level of precision in the matching process that is performed to identify the vehicle position is set to be high, it becomes necessary to set the level of precision of the feature data to be high. Therefore, a piece of lane data is generated for each of the different types of boundary lines such as road boundary lines, dividing lines, and the like. The generated pieces of lane data are recorded into the data recording unit 16 (shown in FIG. 1) in correspondence with the sections each of which is defined between two location points at which the type of line changes.

In other words, for each of the sections within the lane list display section that are positioned between the location points at each of which the type of line changes and for each of the sections that are positioned immediately before an intersection and in which one or more traffic separation marks are displayed, a piece of lane data is generated with respect to the lanes in the section and recorded into the data recording unit 16.

In this case, if a lane list is generated based on all the pieces of lane data, the number of lane groups will be large. As a result, the size of the lane list will be too large and exceed the maximum drawing area of the displaying unit 35. In order to cope with this, according to the present embodiment, the lane data editing processing unit included in the lane list creation processing unit performs a lane data editing processing so as to edit the pieces of lane data and omit one or more pieces of lane data that are not necessary during the process of creating the lane list, although the omitted pieces of data may be necessary when the vehicle position is identified during the vehicle position identifying process and when the traveling lane is identified during the traveling lane identification process.

For this purpose, a display condition determination processing unit included in the lane data editing processing unit performs a display condition determining process so as to determine, for each of the pieces of lane data that correspond to the lane list display section set in the forward direction of the vehicle position, whether or not a display condition under which a lane list is to be generated is satisfied, based on the pieces of lane data, and also based on the characteristics of the lanes.

More specifically, the display condition determination processing unit determines whether a first condition is satisfied or not by determining whether any traffic separation mark is displayed. In the case where one or more separation marks are displayed, the display condition determination processing unit determines that the first condition is satisfied. On the contrary, in the case where no traffic separation mark is displayed, the display condition determination processing unit determines that the first condition is not satisfied. Further, the display condition determination processing unit determines whether a second condition is satisfied or not by determining whether the lane has a change. In the case where the lane has a change, the display condition determination processing unit determines that the second condition is satisfied. On the contrary, in the case where the lane does not have any change, the display condition determination processing unit determines that the second condition is not satisfied. Furthermore, the display condition determination processing unit determines whether a third condition is satisfied or not by determining whether the position of the lane is displaced. In the case where the position of the lane is displaced, the display condition determination processing unit determines that the third condition is satisfied. On the contrary, in the case where the position of the lane is not displaced, the display condition determination processing unit determines that the third condition is not satisfied.

In the case where at least one of the three conditions (i.e., the first, the second, and the third conditions) is satisfied, the display condition determination processing unit determines that the display condition is satisfied. Accordingly, a display setting processing unit included in the lane data editing processing unit performs a display setting process sets the corresponding one of the pieces of lane as a display target. On the contrary, in the case where none of the three conditions (i.e., the first, the second, and the third conditions) is satisfied, the display condition determination processing unit determines that the display condition is not satisfied. Accordingly, the display setting processing unit does not set the corresponding one of the pieces of lane data as a display target and omits the piece of lane data.

After that, a list display processing unit included in the lane list creation processing unit performs a list display process so as to display the lane list based on the pieces of lane data that have been set as the display targets.

A recommended lane setting processing unit included in the lane list creation processing unit performs a recommended lane setting process so as to read the lane number of the recommended lane and display the recommended lane among the lanes shown in the lane list. According to the present embodiment, for example, the background of the recommended lane other than the arrow showing the traveling direction is displayed by using a color that is different from the color of the background of the other lanes, so as to distinguish the recommended lane from the other lanes. Alternatively, the arrow in the recommended lane may be displayed by using a color that is different from the color of the arrows in the other lanes.

Next, examples of the pieces of lane data and the lane list will be explained.

First, in FIGS. 6 and 7 in which a first example is shown, the reference character "km" (where m=11 to 14) denotes a lane. In particular, the lane k11 is an ending lane that will end. The reference character "pn" (where n=11 to 17) denotes a traffic separation mark that indicates, by using an arrow, the traveling direction permitted for the vehicles in the corresponding lane km.

The reference character "dx" (where x=11 to 13) denotes a piece of lane data. In particular, the lane data d11 indicates that the traffic separation marks p11 to p14 are displayed. The notation "LANE ENDING" in the lane data d12 indicates that the lane km has a change, more specifically, in this example, of the two lanes k11 and k12, the lane k11 ends. The lane data d13 indicates that the traffic separation marks p15 to p17 are displayed.

Accordingly, the lane data d11 indicating that the traffic separation marks p11 to p14 are displayed and the lane data d12 indicating that the lane km has a change are set as a display target. The lane group m11, the lane group m12, the lane group m13 are formed such that one lane group is arranged in each line, in correspondence with the lane data d11, the lane data d12, and the lane data 13, respectively. As a result, a lane list Ls11 as shown in FIG. 7 is created.

As for the lane k11 in the lane group m12, the upper side portion eg11 on the lane group m13 side is drawn at an angle in order to indicate that the lane k11 is a lane that ends.

In FIGS. 8 and 9 in which a second example is shown, the reference character "km" (where m=21 to 26) denotes a lane. In particular, the lanes k21 and k23 are each an additional lane that is additionally provided immediately before the intersection. The reference character "pn" (where n=21 to 29) denotes a traffic separation mark that indicates, by using an arrow, the traveling direction permitted for the vehicles in the corresponding lane km.

The reference character "dx" (where x=21 to 23) denotes a piece of lane data. In particular, the lane data d21 and the lane data d23 indicate that the traffic separation marks p21 to p29 are displayed. The notation "ADD LEFT 2" in the lane data d22 indicates that the lane km has a change, more specifically, in this example, that an additional lane is provided on the left side of the lane k21 immediately before the intersection so that the lanes k21 and k25 are provided. The notation "ADD RIGHT 2" in the lane data d22 indicates that the lane km has a change, more specifically, in this example, that an additional lane is provided on the right side of the lane k23 immediately before the intersection so that the lanes k23 and k26 are provided.

Because the additional lanes are provided next to the lane k21 and next to the lane k23, the lane data d22 should be set as a display target. However, because these additional lanes are provided immediately before the intersection, the lane data d22 and the lane data d23 indicating that the traffic separation marks p25 to p29 are displayed are integrated together as a piece of lane data and set as the display target.

Accordingly, in the second example, the lane data d21 and the lane data d23 indicating that the traffic separation marks p21 to p29 are displayed are set as the display targets. The lane group m21 and the lane group m23 are formed so that one lane group is arranged in each line, in correspondence with the lane data d21 and the lane data d23, respectively. As a result, a lane list Ls21 as shown in FIG. 9 is created.

In this case, as for the lanes k25 and k26 in the lane group m23, base portions eg21 and eg22 on the lane group m21 side are each drawn at an angle in order to indicate that the lanes k25 and k26 are each an additional lane that is provided immediately before the intersection.

In FIGS. 10 and 11 in which a third example is shown, the reference character "km" (where m=31 to 37) denotes a lane. In particular, the lanes k31 and k32 are combined lanes from which the dividing line therebetween disappears (while the width of each of the two lanes k31 and the k32 is maintained). On the other hand, the lane k35 is a split lane in which a dividing line is drawn at the center thereof (while the width of the lane k35 is maintained). The lane k34 is an additional lane, whereas the lane k33 is the recommended lane. The reference character "pn" (where n=31 to 36) denotes a traffic separation mark that indicates, by using an arrow, the traveling direction permitted for the vehicles in the corresponding lane km.

The reference character "dx" (where x=31 to 33) denotes a piece of lane data. The notation "COMBINED" in the lane data d31 indicates that the lane km has a change, more specifically, in this example, that the lanes k31 and k32 are combined to become one lane, namely, the lane k35. The notation "SPLIT" in the lane data d32 indicates that the lane km has a change, more specifically, in this example, that the lane k35 is split to become two lanes, namely, the lanes k36 and k32. The notation "ADD RIGHT 2" in the lane data d32 indicates that the lane km has a change, more specifically, in this example, that an additional lane is provided on the right side of the lane k34 immediately before the intersection so that the lanes k34 and k37 are provided.

Accordingly, the lane data d31 and the lane data d32 each of which indicates that the lane km has a change as well as the lane data d33 indicating that the traffic separation marks p31 to p35 are displayed are set as the display targets. The lane groups m31, m32, and m33 are formed so that one lane group is arranged in each line, in correspondence with the lane data d31, the lane data 32, and the lane data 33, respectively. As a result, a lane list Ls31 as shown in FIG. 11 is created.

In this case, a diagonal line eg31 is drawn on the lane group m31 side in order to indicate that the lane k35 in the lane group m32 is a combined lane. Also, a diagonal line eg32 is drawn on the lane group m32 side in order to indicate that the lanes k36 and k32 in the lane group m33 are split lanes. In addition, as for the lane k37 in the lane group m33, a base portion eg33 on the lane group m32 side is drawn at an angle in order to indicate that the lane k37 is an additional lane that is provided immediately before the intersection.

As explained above, according to the present embodiment, in the case where at least one of the three conditions (i.e., the first, the second, and the third conditions) is satisfied, such as in the case where one or more traffic separation marks pn are displayed, and/or in the case where the lane km has a change, and/or in the case where the position of the lane km is displaced, the corresponding piece of lane data is set as a display target. In the case where none of the three conditions (i.e., the first, the second, and the third conditions) is satisfied, the corresponding piece of lane data is not set as a display target. Thus, it is possible to prevent the size of the lane list from becoming too large. As a result, the size of the lane list does not exceed the maximum drawing area of the displaying unit 35.

Next, a flowchart will be explained.

Step S1: It is determined whether any traffic separation mark is displayed. In the case where one or more traffic separation marks are displayed, the process proceeds to step S5. On the contrary, in the case where no traffic separation mark is displayed, the process proceeds to step S2.

Step S2: It is determined whether the lane has a change or not. In the case where the lane has a change, the process proceeds to step S5. On the contrary, in the case where the lane has no change, the process proceeds to step S3.

Step S3: It is determined whether the position of the lane has been displaced. In the case where the position of the lane has been displaced, the process proceeds to step S5. On the contrary, in the case where the position of the lane has not been displaced, the process proceeds to step S4.

Step S4: The corresponding piece of lane data is not set as a display target, and the process is ended.

Step S5: The corresponding piece of lane data is set as a display target, and the process is ended.

In the case where the vehicle position is located in one of the lanes corresponding to the pieces of lane data that have been set as the display targets, it is possible to display the vehicle position in the lane list without any problem. However, in the case where the vehicle position is located in one of the lanes corresponding to the pieces of lane data that have not been set as the display target, it is not possible to display the vehicle position in the lane list.

Next, a second embodiment of the present invention that copes with the problem mentioned above will be explained. According to the second embodiment of the present invention, even if the vehicle position is located in one of the lanes corresponding to the pieces of lane data that have not been set as the display target, it is possible to display the vehicle position in the lane list. In the following explanation, some of the structural elements that have the same configurations as those in the first embodiment will be referred to by using the same reference characters. The advantageous effects of the invention that are achieved by using the same configurations as those in the first embodiment are incorporated herein by reference to the advantageous effects explained in the description of the first embodiment.

Figure 12:
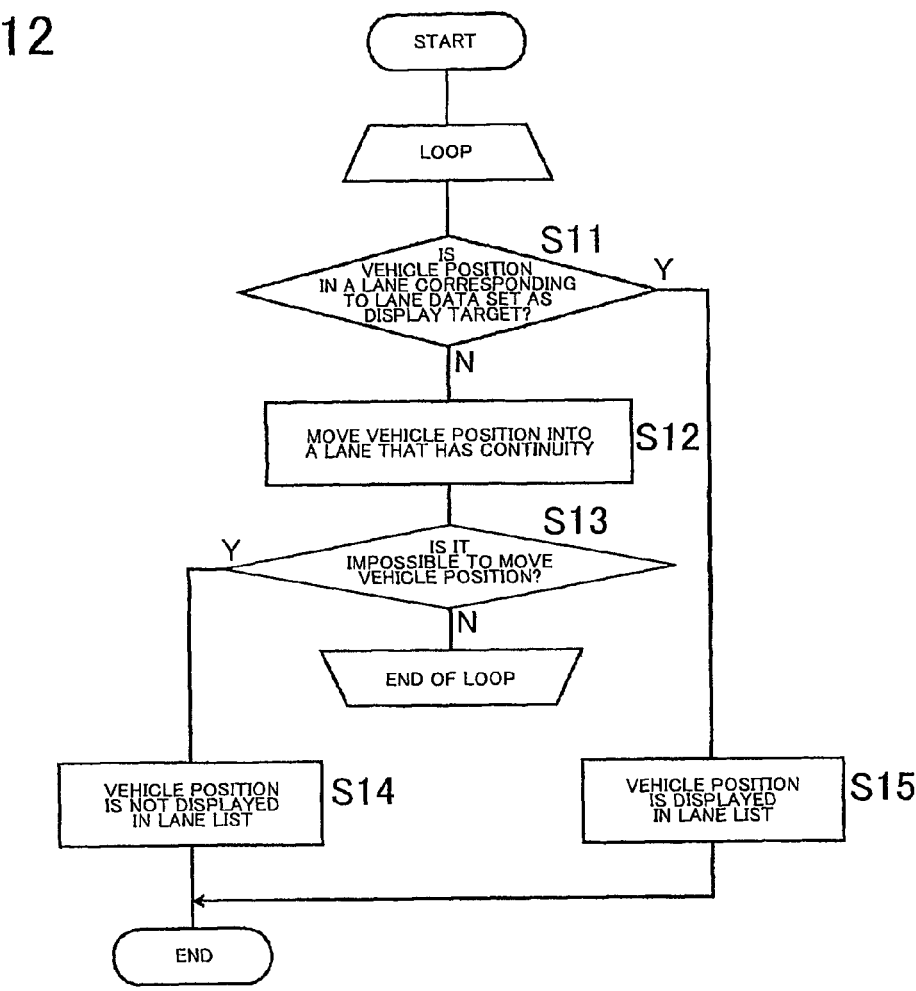
FIG. 12 is a flowchart that shows an operation performed by a lane list creation processing unit according to a second embodiment of the present invention.
Figure 13:
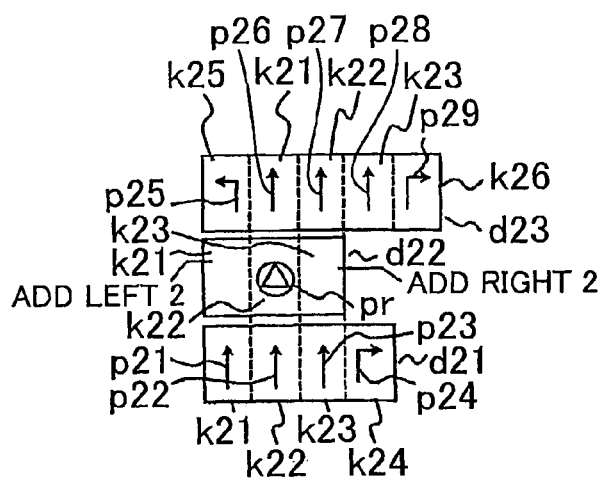
FIG. 13 is a first drawing that shows an example of edited lane data according to the second embodiment of the present invention.
Figure 14:
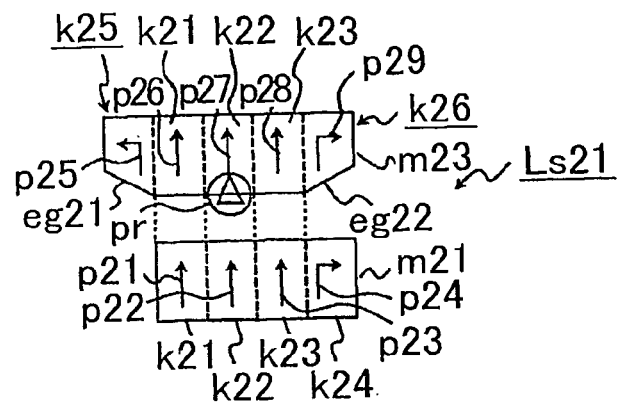
FIG. 14 is a first drawing that shows an example of a lane list according to the second embodiment of the present invention.
Figure 15:
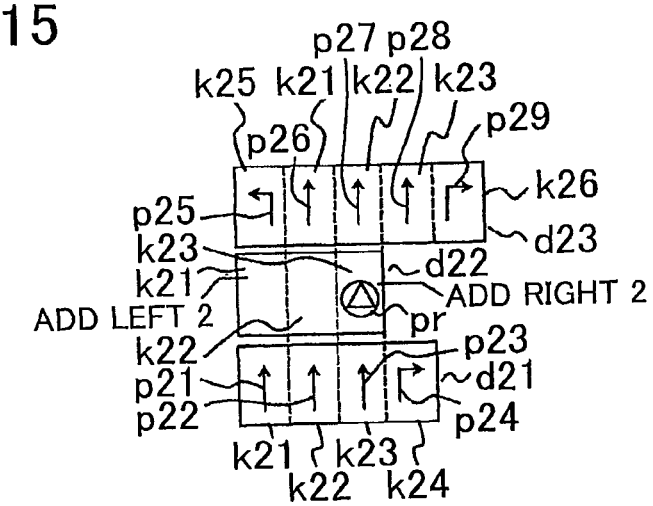
FIG. 15 is a second drawing that shows another example of edited lane data according to the second embodiment of the present invention.
Figure 16:
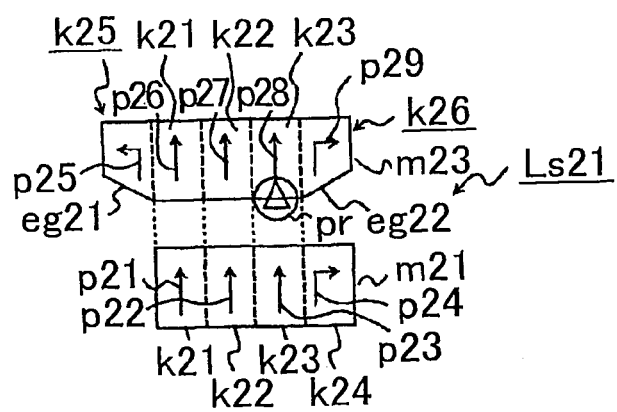
FIG. 16 is a second drawing that shows another example of a lane list according to the second embodiment of the present invention.
Figure 17:
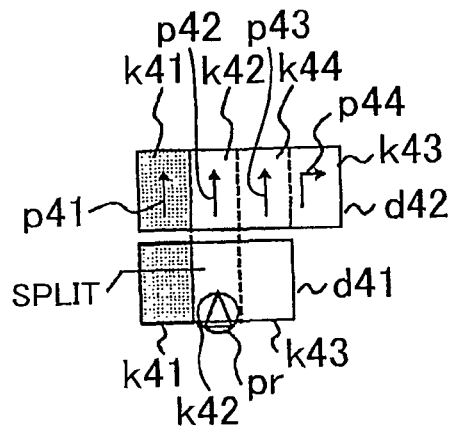
FIG. 17 is a third drawing that shows yet another example of edited lane data according to the second embodiment of the present invention.
Figure 18:
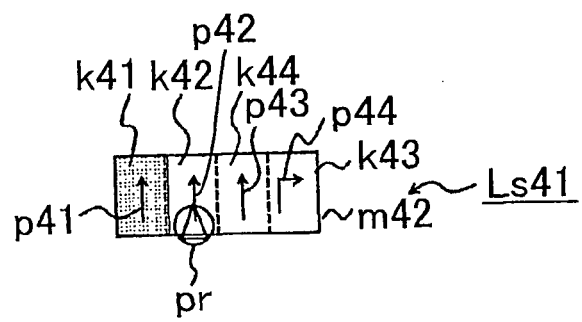
FIG. 18 is a third drawing that shows yet another example of a lane list according to the second embodiment of the present invention.
Figure 19:
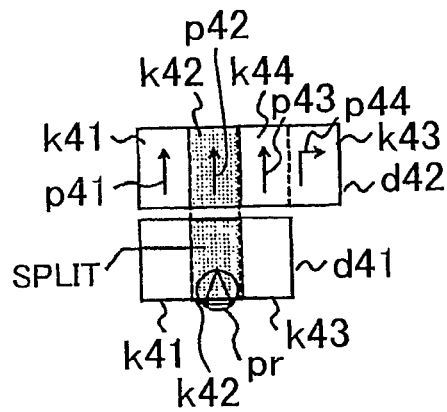
FIG. 19 is a fourth drawing that shows yet another example of edited lane data according to the second embodiment of the present invention.
Figure 20:
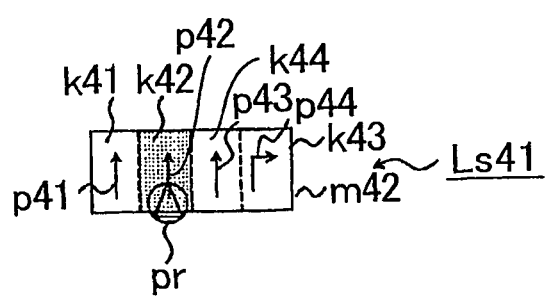
FIG. 20 is a fourth drawing that shows yet another example of a lane list according to the second embodiment of the present invention.
Figure 21:
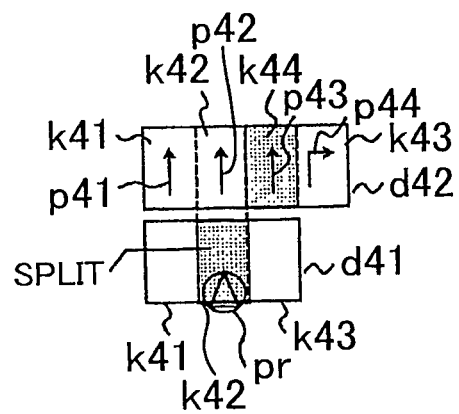
FIG. 21 is a fifth drawing that shows yet another example of edited lane data according to the second embodiment of the present invention.
Figure 22:
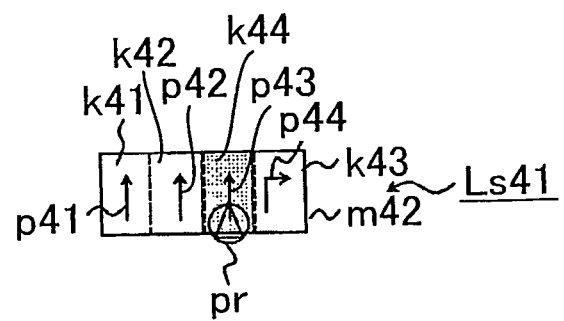
FIG. 22 is a fifth drawing that shows yet another example of a lane list according to the second embodiment of the present invention.

FIG. 12 is a flowchart that shows an operation performed by the lane list creation processing unit according to the second embodiment of the present invention. FIG. 13 is a first drawing that shows an example of edited lane data according to the second embodiment of the present invention. FIG. 14 is a first drawing that shows an example of a lane list according to the second embodiment of the present invention. FIG. 15 is a second drawing that shows another example of edited lane data according to the second embodiment of the present invention. FIG. 16 is a second drawing that shows another example of a lane list according to the second embodiment of the present invention. FIG. 17 is a third drawing that shows yet another example of edited lane data according to the second embodiment of the present invention. FIG. 18 is a third drawing that shows yet another example of a lane list according to the second embodiment of the present invention. FIG. 19 is a fourth drawing that shows yet another example of edited lane data according to the second embodiment of the present invention. FIG. 20 is a fourth drawing that shows yet another example of a lane list according to the second embodiment of the present invention. FIG. 21 is a fifth drawing that shows yet another example of edited lane data according to the second embodiment of the present invention. FIG. 22 is a fifth drawing that shows yet another example of a lane list according to the second embodiment of the present invention.

In these cases, a vehicle position display determination processing unit included in the lane list creation processing unit performs a vehicle position display determination process so as to determine whether or not the vehicle position is located in one of the lanes corresponding to the pieces of lane data that have been set as the display targets. In the case where the vehicle position is located in one of the lanes corresponding to the pieces of lane that have been set as the display targets, a vehicle position display processing unit included in the lane list creation processing unit performs a vehicle position displaying process so as to display the vehicle position in the lane list. On the contrary, in the case where the vehicle position is not located in any of the lanes corresponding to the pieces of data that have been set as the display targets, a vehicle position moving processing unit included in the lane list creation processing unit performs a vehicle position moving process so as to move the vehicle position into one of the lanes corresponding to the pieces of lane data that have continuity (i.e., the pieces of lane data continued from the piece of lane data showing the vehicle position). The vehicle position display determination processing unit then determines whether or not the vehicle position is located in one of the lanes corresponding to the pieces of lane data that have been set as the display targets. The vehicle position is moved in this manner until the vehicle position is located in one of the lanes corresponding to the pieces of lane data that have been set as the display targets. When the vehicle position is located in one of the lanes corresponding to the pieces of lane data that have been set as the display targets, the vehicle position display processing unit displays the vehicle position in the lane list.

In the case where it is not possible to move the vehicle position due to a failure or the like, the lane list creation processing unit will not display the vehicle position in the lane list.

Next, examples of the lane data and the lane list will be explained.

First, in FIGS. 13 to 16 in which a first example and a second example are shown, the reference character "pr" denotes the vehicle position. The reference character "km" (where m=21 to 26) denotes a lane. In particular, the lanes k21 and k23 are each an additional lane that is additionally provided immediately before the intersection. The reference character "pn" (where n=21 to 29) denotes a traffic separation mark that indicates, by using an arrow, the traveling direction permitted for the vehicles in the corresponding lane km.

The reference character "dx" (where x=21 to 23) denotes a piece of lane data. In particular, the lane data d21 and the lane data d23 indicate that the traffic separation marks p21 to p29 are displayed. The notation "ADD LEFT 2" in the lane data d22 indicates that the lane km has a change, more specifically, in this example, that an additional lane is provided on the left side of the lane k21 immediately before the intersection so that the lanes k25 and k21 are provided. The notation "ADD RIGHT 2" in the lane data d22 indicates that the lane km has a change, more specifically, in this example, an additional lane is provided on the right side of the lane k23 so that the lanes k23 and k26 are provided.

Because the additional lanes are provided next to the lane k21 and next to the lane k23, the lane data d22 should be set as a display target. However, because the additional lanes are provided immediately before the intersection, the lane data d22 and the lane data d23 indicating that the traffic separation marks p25 to p29 are displayed are integrated together as a piece of lane data and set as the display target.

Accordingly, in the first and the second examples, the lane data d21 and the lane data d23 indicating that the traffic separation marks p21 to p29 are displayed are set as the display targets. The lane group m21 and the lane group m23 are formed so that one lane group is arranged in each line, in correspondence with the lane data d21 and the lane data d23, respectively. As a result, a lane list Ls21 as shown in FIGS. 14 and 16 is generated.

In this case, as for the lanes k25 and k26 in the lane group m23, the base portions eg21 and eg22 on the lane group m21 side are each drawn at an angle in order to indicate that the lanes k25 and k26 are each an additional lane that is provided immediately before the intersection.

As explained above, according to the present embodiment, the vehicle position display determination processing unit determines whether or not the vehicle position pr is located in one of the lanes corresponding to the pieces of lane data that have been set as the display targets. In the first example, as shown in FIG. 13, the vehicle position pr is located in the lane k22 corresponding to the lane data d22 that has not been set as a displayed target. Thus, the vehicle position moving processing unit moves the vehicle position pr into the lane k22 corresponding to the lane data d23 that has continuity. Subsequently, as shown in FIG. 14, the vehicle position display processing unit displays the vehicle position pr in the lane k22 within the lane group m23 shown in the lane list Ls21.

In the second example, as shown in FIG. 15, the vehicle position pr is located in the lane k23 that is an additional lane corresponding to the lane data d22 that has not been set as a display target, and also an additional lane is provided on the right side of the lane k23 so that the lanes k23 and k26 are provided. Thus, the vehicle position moving processing unit can move the vehicle position pr into the lane k23 or the lane k26 corresponding to the lane data d23 that has continuity. In this case, however, the vehicle position moving processing unit moves the vehicle position pr into the lane k23, that is originally provided, rather than into the lane k26, which has additionally been provided. After that, as shown in FIG. 16, the vehicle position display processing unit displays the vehicle position pr into the lane k23 within the lane group m23 shown in the lane list Ls21.

In FIGS. 17 to 22 in which the third, the fourth, and the fifth examples are shown, the reference character "pr" denotes the vehicle position. The reference character "km" (where m=41 to 45) denotes a lane. In particular, the lanes k42 denotes a split lane in which a dividing line is drawn at the center thereof, whereas the lane k41 is the recommended lane. The reference character "pn" (where n=41 to 44) denotes a traffic separation mark that indicates, by using an arrow, the traveling direction permitted for the vehicles in the corresponding lane km.

The reference character "dx" (where x=41 or 42) denotes a piece of lane data. The notation "SPLIT" in the lane data d41 indicates that the lane km has a change, more specifically, in this example, that the lane k42 is split so that two lanes, namely, the lanes k42 and k43, are provided. The lane data d42 indicates that the traffic separation marks p41 to p44 are displayed.

Because the lane k42 is split into the two lanes, the lane data d41 should be set as a display target. However, because the lane is split into the two lanes immediately before the intersection, the lane data d41 and the lane data d42 indicating that the traffic separation marks p41 to p44 are displayed are integrated together as a piece of lane data and set as the display target.

Accordingly, in the third, the fourth, and the fifth examples, the lane data d42 indicating that the traffic separation marks p41 to p44 are displayed is set as the display target. The lane group m42 is formed so as to be arranged in one line, in correspondence with the lane data d42. As a result, a lane list Ls41 as shown in FIGS. 18, 20, and 22 is generated.

The vehicle position display determination processing unit determines whether or not the vehicle position pr is located in one of the lanes corresponding to the pieces of lane data that have been set as the display targets. In the third example, as shown in FIG. 17, the vehicle position pr is located in the lane k42 corresponding to the lane data d41 that has not been set as a display target. The lane k42 is a split lane and is split into the lanes k42 and k44 corresponding to the lane data d42. Accordingly, the vehicle position moving processing unit can move the vehicle position pr to the lane k42 or the lane k44 corresponding to the lane data d42 that has continuity. In this case, however, because the lane k42 is not the recommended lane before the vehicle position is moved, the vehicle position moving processing unit moves the vehicle position pr into the lane k42, which is, of the two lanes k42 and k44, the lane positioned on the left.

After that, as shown in FIG. 18, the vehicle position display processing unit displays the vehicle position pr in the lane k42 within the lane group m42 shown in the lane list Ls41.

In the fourth example, as shown in FIG. 19, the vehicle position pr is in the lane k42 corresponding to the lane data d41 that has not been set as a display target. The lane k42 is a split lane and is split into the lanes k42 and k44 corresponding to the lane data d42. Accordingly, the vehicle position moving processing unit can move the vehicle position pr into the lane k42 or the lane k44 corresponding to the lane data d42 that has continuity. In this case, however, because the lane k42 is not the recommended lane before the vehicle position is moved, the vehicle position moving processing unit moves the vehicle position pr into the lane k42, which is, of the two lanes k42 and k44, the recommended lane After that, as shown in FIG. 20, the vehicle position display processing unit displays the vehicle position pr in the lane k42 within the lane group m42 shown in the lane list Ls41.

In the fifth example, as shown in FIG. 21, the vehicle position pr is in the lane k42 corresponding to the lane data d41 that has not been set as a display target. The lane k42 is a split lane and is split into the lanes k42 and k44 corresponding to the lane data d42. Accordingly, the vehicle position moving processing unit can move the vehicle position pr into the lane k42 or the lane k44 corresponding to the lane data d42 that has continuity. In this case, however, although the lane k42 is the recommended lane before the vehicle position is moved, the recommended lane is changed to the lane k44 in the lane data d42. Thus, the vehicle position moving processing unit moves the vehicle position pr into the lane k44, which is, of the two lanes k42 and k44, the recommended lane.

After that, as shown in FIG. 22, the vehicle position display processing unit displays the vehicle position pr into the lane k44 within the lane group m42 shown in the lane list Ls 41.

As explained above, according to the present embodiment, in the case where the vehicle position pr is not positioned in one of the lanes corresponding to the piece of lane data that have been set as the display targets, the vehicle position pr is moved into one of the lanes corresponding to the pieces of lane data that have continuity. When the vehicle position pr has been positioned in one of the lanes corresponding to the pieces of lane data that have been set as the display targets, the vehicle position pr is displayed in the lane list. Accordingly, it is possible to display the vehicle position pr in one of the lanes in the lane list which the vehicle is predicted to reach sooner or later. As a result, it is possible to smoothly drive the vehicle according to the lane list.

In the case where an additional lane is provided or where a lane is split into two or more lanes, the vehicle position pr is displayed in the lane that is originally provided, but not in the lane that is added due to the addition or the split. In the case where a lane is split into two or more lanes, if the vehicle is traveling in a lane that is not the recommended lane, the vehicle position pr will be displayed in the lane that is in the leftmost position among the plurality of lanes that are provided due to the split. If the vehicle is traveling in the recommended lane, the vehicle position pr will be displayed in the recommended lane among the plurality of lanes that are provided due to the split. Thus, the vehicle position pr will be displayed in the lane in which the vehicle is highly likely to travel.

As a result, it is possible to smoothly drive the vehicle according to the lane list.

Next, a flowchart will be explained.

Step S11: It is determined whether or not the vehicle is positioned in one of the lanes corresponding to the pieces of lane data that have been set as the display targets. In the case where the vehicle position is located in one of the lanes corresponding to the pieces of lane data that have been set as the display targets, the process proceeds to step S15. On the contrary, in the case where the vehicle position is not located in any of the lanes corresponding to the pieces of lane data that have been set as the display targets, the process proceeds to step S12.

Step S12: The vehicle position pr is moved into a lane that has continuity.

Step S13: It is determined whether it is impossible to move the vehicle position. In the case where it is impossible to move the vehicle position, the process proceeds to step S14. On the contrary, in the case where it is not impossible to move the vehicle position, the process returns to step S1.

Step S14: The process is ended without having the vehicle position pr displayed in the lane list Ls41.

Step S15: The process ends after having the vehicle position pr displayed in the lane list Ls41.

In the embodiments described above, in the case where the lane km has a change (e.g., when an additional lane is provided for the lane km or when the lane km is split into two or more lanes), the corresponding piece of lane data is set as a display target. However, in the case where an additional lane is provided or the lane is split into two or more lanes in many parts of the road, it is acceptable that the corresponding pieces of lane data are not set as the display targets.

The present invention is not limited to the exemplary embodiments described above and can be modified in various ways on the basis of the gist of the present invention. These modifications are not excluded from the scope of the present invention.

The invention claimed is:

1. A route guidance system comprising:
    a current position detecting unit that detects a current position of a vehicle as a vehicle position;
    a display condition determination processing unit that determines, for each of pieces of lane data that correspond to a lane list display section set in a forward direction of the vehicle position, whether a display condition under which a lane list is to be created is satisfied, based on the pieces of lane data;
    a display setting processing unit that sets a piece of the lane data that satisfies the display condition as a display target;
    a list display processing unit that displays the lane list based on the piece of the lane data that has been set as the display target and displays the detected vehicle position on the lane list;
    a vehicle position display determination processing unit that determines whether the vehicle position is located in a lane corresponding to the piece of the lane data that has been set as the display target; and
    a vehicle position moving processing unit that, in a case where the vehicle position is not located in the lane corresponding to the piece of the lane data that has been set as the display target, moves the vehicle position into a lane corresponding to a piece of lane data that has continuity.

2. The route guidance system according to claim 1, wherein the display setting processing unit sets a piece of the lane data indicating that a traffic separation mark is displayed as the display target.

3. The route guidance system according to claim 1, wherein the display setting processing unit sets a piece of the lane data indicating that a corresponding lane has a change as the display target.

4. The route guidance system according to claim 1, wherein the display setting processing unit sets a piece of the lane data indicating that a position of a corresponding lane is displaced as the display target.

5. A route guidance method comprising:
    detecting a current position of a vehicle as a vehicle position;
    determining, for each of pieces of lane data that correspond to a lane list display section set in a forward direction of the vehicle position, whether a display condition under which a lane list is to be created is satisfied, based on the pieces of lane data;
    setting a piece of the lane data that satisfies the display condition as a display target;
    displaying the lane list based on the piece of the lane data that has been set as the display target;
    displaying the detected vehicle position on the lane list;
    determining whether the vehicle position is located in a lane corresponding to the piece of the lane data that has been set as the display target; and
    in a case where the vehicle position is not located in the lane corresponding to the piece of the lane data that has been set as the display target, moving the vehicle position into a lane corresponding to a piece of lane data that has continuity.

* * * * *